July 16, 1946.    F. G. GEPFERT    2,404,048
DRILL
Filed Aug. 5, 1944

INVENTOR.
FRANKLIN G. GEPFERT
BY
Morton S. Brockman

Patented July 16, 1946

2,404,048

UNITED STATES PATENT OFFICE 2,404,048

DRILL

Franklin G. Gepfert, Shaker Heights, Ohio

Application August 5, 1944, Serial No. 548,150

2 Claims. (Cl. 77—70)

This invention relates to drills, and particularly to drills used for penetrating hardened metals. This particular invention is an improvement of the drill patented by Lester G. Black, on October 28, 1941, under Patent No. 2,260,288.

The primary object of this invention is to provide a drill of the type mentioned which more rapidly removes the chips or shavings from the hole being drilled. It also enables the drill to be used for a longer period of time without resharpening.

These and other objects of the invention will become apparent from the following specification and claims, together with the accompanying drawing, wherein like parts are referred to and indicated by like reference characters and wherein:

Figure 1:
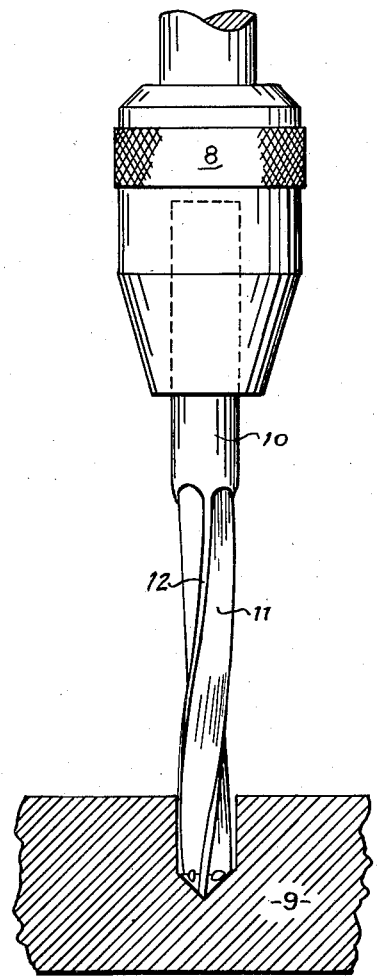
Figure 1 is a view of the improved drill as it is mounted in a collet chuck.
Figures 2, 4:
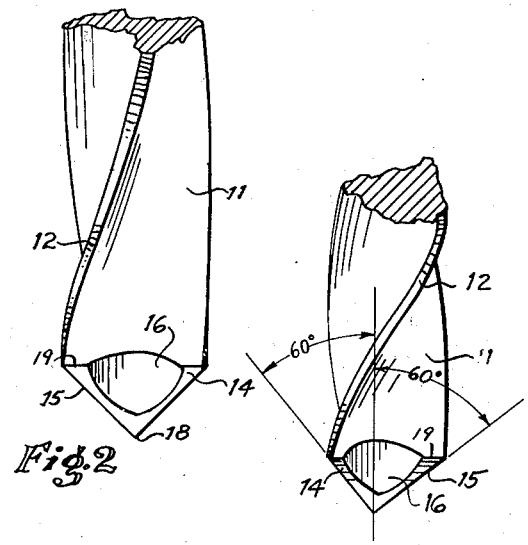
Figure 2 is an enlarged elevational view of a portion of the body of the drill and the end thereof as viewed from one angle.
Figure 4 is a view similar to that of Figures 2 and 3 but viewed from still another angle or direction.
Figure 3:
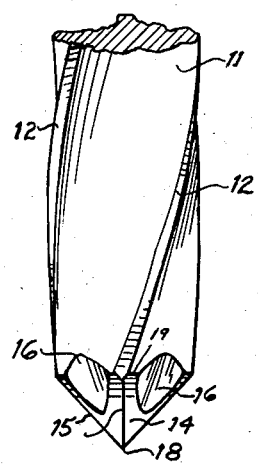
Figure 3 is a view similar to that of Figure 2 but viewed from another angle.

Referring to the drawing, there is shown in the Figure 1 a drill having a shank portion 10 which fits into a regular collet chuck 8 or other holder. The Figure 1 also shows a cross section of the work 9.

Figure 5:
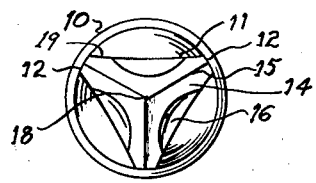
Figure 5 is a bottom end view of the drill.

The drill member consists of three integral parts which will be described separately. First, there is the round shank portion 10 that is more or less standard and which in itself possesses no novel features, as far as this invention is concerned. Next, there is the body portion of the drill which is below the shank portion 10. The body portion has three spiraliform flutes 11 and three helical fillets 12 therebetween. The flutes 11 are ground out of the solid metal forming the body portion and are preferably substantially flat or straight across. However, they are very slightly concave in cross section, as is shown in the Figure 5 due to the convexity of the grinding wheel. The fillets 12 are not sharp but are slightly convex. Peripheral lines on the convex surfaces of the fillets 12 are parallel to the peripheral surface of the shank portion and have slightly smaller arcs, but are concentric therewith, as is clearly shown in the Figure 5. The helixes or spirals formed by the fillets are uniform throughout the entire length of the body and are equidistant from and parallel with each other. The body portion of the drill just below the shank portion 10 is slightly conical and in all other respects follows the standard Morse taper dimensions used for some of the prior art drills.

The end portion of the drill specifically shown in the Figures 2, 3, 4 and 5 of the drawing has three acute radially and longitudinally extending ridges 15 which extend from the longitudinal axis or center 18 of the drill to the center of each of the three fillets 12. These ridges are formed by grinding three perfectly flat facets 14 thereon at an angle of forty degrees from the longitudinal axis of the drill and form thereat three laterally extending ridges 19. The acute radially extending ridges 15 of the end portion are the only parts of this drill that make frictional contact with the work being perforated, and are at an angle of about sixty degrees from the longitudinal axis of the drill. This drill, unlike the drill shown in the Patent No. 2,260,288 which has perfectly straight flat flutes and straight non-inclining parallel fillets, does not burnish or scrape the inside surface of the hole due to the upward taper of the instant body.

The chip clearance grooves 16 of the instant drill are somewhat larger than the grooves of the earlier drill shown in the Patent No. 2,260,288 and they make possible an easier passage of the chips upward along the flutes 11. These grooves 16 are concave and consume the large central portions of the facets 16 and thereby smoothly connect with the adjacent flutes 11.

It will now be clear that there is provided by this invention a drill for penetrating hardened metals and which accomplishes the objects set forth. While the invention is illustrated and described in a certain preferred form, it is obvious that there may be other forms or adaptations of the invention. For example, the drill body may be made with four or more flutes and fillets instead of with the three as shown. The drill body may also be made of untapered stock, if desired. The drill end for some purposes may be made straight or concave instead of being pointed as shown. These modifications are also considered to be included in this invention, as no limitations upon it are intended other than those imposed thereon by the scope of the appended claims.

I claim:

1. A drill of the type described, comprising in combination, a round shank portion receivable by a holder, a body portion substantially triangular in cross section integral with the shank portion and having spiraliform flutes thereon forming helical fillets therebetween, the said flutes having substantially flat surfaces and the said fillets having peripheral surfaces concentric with the said shank portion, and a pyramidal end portion integral with the body portion and having flat facets thereon forming straight radially and longitudinally extending ridges therebetween, each of the said facets abutting a flute and forming thereat a lateral ridge, each of the said radially extending ridges abutting a fillet and all of the same forming a sharp point at the axis of the drill, the said body and end portions having a concave groove at each lateral ridge, and each of the said grooves consuming a substantially large portion of the facet thereat.

2. A drill of the type described, comprising in combination, a shank portion receivable by a holder, a body portion integral with the shank portion and having three or more spiraliform flutes thereon forming three or more helical fillets therebetween, the said flutes having substantially flat surfaces, and an end portion integral with the body portion and having three or more facets thereon forming three or more radially and longitudinally extending ridges therebetween, each of the said facets being at an angle of about forty degrees from the axis of the drill and abutting a flute and forming a lateral ridge thereat, each of the said radially extending ridges abutting a fillet and all of the same forming a sharp point at the axis of the drill, the said body and end portions having a concave groove at each lateral ridge, and each of the said grooves consuming a substantially large portion of the facet thereat.

FRANKLIN G. GEPFERT.